United States Patent
Lee et al.

(10) Patent No.: US 11,424,639 B2
(45) Date of Patent: Aug. 23, 2022

(54) WIRELESS CHARGING COIL AND ELECTRONIC DEVICE INCLUDING THE SAME

(71) Applicant: SAMSUNG ELECTRONICS CO., LTD., Suwon-si (KR)

(72) Inventors: Juhyang Lee, Suwon-si (KR); Yusu Kim, Suwon-si (KR); Kyungmin Park, Suwon-si (KR); Yongsang Yun, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 16/582,094

(22) Filed: Sep. 25, 2019

(65) Prior Publication Data

US 2020/0119576 A1   Apr. 16, 2020

(30) Foreign Application Priority Data

Oct. 12, 2018   (KR) .......................... 10-2018-0122130

(51) Int. Cl.
*H02J 7/02* (2016.01)
*H01F 27/28* (2006.01)
*H02J 50/10* (2016.01)

(52) U.S. Cl.
CPC .......... *H02J 7/025* (2013.01); *H01F 27/2804* (2013.01); *H02J 50/10* (2016.02)

(58) Field of Classification Search
CPC ........ H02J 7/025; H02J 50/10; H01F 27/2804
(Continued)

(56) References Cited

U.S. PATENT DOCUMENTS

| 7,622,895 B1 * | 11/2009 | Griffin | ................ | H02J 7/0047 320/132 |
| 2009/0218983 A1 * | 9/2009 | Loudot | ................. | H02J 7/35 320/101 |

(Continued)

FOREIGN PATENT DOCUMENTS

| JP | 2001-085230 | | 3/2001 |
| KR | 10-2014-0034009 | * | 3/2014 |

(Continued)

OTHER PUBLICATIONS

International Search Report dated Jan. 31, 2020 in counterpart International Patent Application No. PCT/KR2019/012362.

(Continued)

*Primary Examiner* — Suresh Memula
(74) *Attorney, Agent, or Firm* — Nixon & Vanderhye P.C.

(57) ABSTRACT

According to embodiments, a wireless charging coil and an electronic device including the same are provided. The electronic device may include a battery; a wireless charging coil; a wireless charging circuit configured to wirelessly transmit and/or receive power using the wireless charging coil; and a processor electrically connected to the battery, the wireless charging coil, and the wireless charging circuit, wherein based on another electronic device being positioned within a specified transmission and/or reception distance of the electronic device, the processor is configured to control the electronic device to transmit power stored in the battery to the other electronic device using the wireless charging coil and the wireless charging circuit. Therefore, the electronic device can wirelessly charge another electronic device, a watch, and an earbud in which the remaining battery capacity is insufficient.

18 Claims, 13 Drawing Sheets

(58) Field of Classification Search
USPC .......................................................... 320/108
See application file for complete search history.

(56) References Cited

U.S. PATENT DOCUMENTS

| | | | |
|---|---|---|---|
| 2010/0072953 A1* | 3/2010 | Mitsutani | B60L 58/15 |
| | | | 320/152 |
| 2016/0134157 A1* | 5/2016 | Maeno | H02J 7/35 |
| | | | 320/101 |
| 2017/0040690 A1 | 2/2017 | Peralta et al. | |
| 2017/0088003 A1* | 3/2017 | Yu | B60W 20/00 |
| 2017/0117086 A1 | 4/2017 | Ridler | |
| 2017/0228721 A1* | 8/2017 | Lee | G06Q 20/204 |
| 2017/0274783 A1* | 9/2017 | Kuribara | B60L 53/20 |
| 2017/0279495 A1 | 9/2017 | Kim et al. | |
| 2018/0248255 A1 | 8/2018 | Noh et al. | |
| 2018/0290645 A1* | 10/2018 | Zhao | B60W 10/26 |
| 2018/0361865 A1* | 12/2018 | Bando | B60L 53/30 |
| 2019/0074577 A1 | 3/2019 | Kim et al. | |
| 2020/0164763 A1* | 5/2020 | Holme | B60L 58/10 |
| 2021/0336485 A1* | 10/2021 | Narampanawe | H02J 50/005 |

FOREIGN PATENT DOCUMENTS

| | | | |
|---|---|---|---|
| KR | 10-2014-0121549 | 10/2014 | |
| KR | 10-2017-0111434 | 10/2017 | |
| KR | 10-2018-0017687 | 2/2018 | |
| KR | 10-2018-0041106 | 4/2018 | |
| WO | WO 2017/027326 A1 | 2/2017 | |
| WO | WO-2017064582 A1 * | 4/2017 | B60K 1/00 |
| WO | 2017/078481 | 5/2017 | |
| WO | WO-2017099649 A1 * | 6/2017 | B60L 50/50 |
| WO | WO-2019136366 A1 * | 7/2019 | B60K 1/00 |

OTHER PUBLICATIONS

Partial European Search Report dated Jan. 19, 2022 for EP Application No. 19870124,5.

* cited by examiner

WIRELESS CHARGING COIL AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2018-0122130, filed on Oct. 12, 2018, in the Korean Intellectual Property Office, the disclosure of which is incorporated by reference herein in its entirety.

BACKGROUND

1. Field

The disclosure relates to a wireless charging coil and an electronic device including the same.

2. Description of Related Art

Electronic devices such as a mobile terminal may receive power related to driving from a battery.

The electronic device may charge a battery using a wireless charging method as well as wired charging. For example, the wireless charging method may include an electromagnetic inductive method, a magnetic resonance method, or another wireless charging method.

As the technology related to the wireless charging method has developed, research has been conducted on a method of wirelessly charging various electronic devices using one charging device.

Electronic devices such as a mobile terminal may include a coil that can charge a battery during wireless charging.

An electronic device including the coil may perform, for example, a role of wirelessly receiving power from a charging device such as a wireless charging pad.

When a charging adapter or a wireless charging pad is not prepared, the electronic device may need to wirelessly transmit charging power to another electronic device such as a watch and an earbud in which the remaining battery capacity is insufficient.

SUMMARY

Embodiments of the disclosure may provide a wireless charging coil and an electronic device including the same that can perform a function of receiving power in a wireless manner as well as a function of transmitting and charging power to another electronic device.

Embodiments of the disclosure may provide a wireless charging coil capable of uniformly forming a magnetic field or an electronic device including the wireless charging coil.

Embodiments of the disclosure may provide a wireless charging coil having low equivalent resistance to a wireless power signal and/or an electronic device including the wireless charging coil.

According to various example embodiments of the disclosure, a wireless charging coil may include a printed circuit board; a first coil pattern portion disposed on a first side of the printed circuit board; and a second coil pattern portion disposed on a second side of the printed circuit board opposite the first side, wherein the first coil pattern portion includes a 1-1 (e.g., a first first coil) pattern and a 1-2 (e.g., a second first coil) pattern, each wound in a spiral shape; and at least one first through-hole formed at a predetermined position of the 1-1 pattern and the 1-2 pattern, wherein the second coil pattern portion includes a 2-1 (e.g., a first second coil) pattern and 2-2 (e.g., a second second coil) pattern in which a partial area is short-circuited and wound in a spiral shape; and at least one second through-hole formed at a predetermined position of the 2-1 pattern and the 2-2 pattern, wherein the first coil pattern portion and the second coil pattern portion are electrically connected through the first through-hole and the second through-hole and wherein widths of the 1-1 pattern and the 1-2 pattern decrease a specified amount from an outside direction to an inside direction.

According to various example embodiments of the disclosure, an electronic device may include a battery; a wireless charging coil; a wireless charging circuit configured to wirelessly transmit and/or receive power using the wireless charging coil; and a processor electrically connected to the battery, the wireless charging coil, and the wireless charging circuit, wherein based on another electronic device being positioned within a specified transmission distance of the electronic device, the processor is configured to control the electronic device to transmit power stored in the battery to the other electronic device using the wireless charging coil and the wireless charging circuit.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The electronic devices may include, for example, and without limitation, at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like), or the like.

The electronic devices may further include, for example, and without limitation, at least one of parts of furniture or buildings/structures, electronic boards, electronic signature receiving devices, projectors, various measuring instruments (such as water meters, electricity meters, gas meters, or wave meters, and the like), or the like. The electronic devices may be one or more combinations of the above-mentioned devices. The electronic devices may be flexible electronic devices. Also, the electronic devices are not limited to the above-mentioned devices, and may include new electronic devices according to the development of new technologies.

Embodiments of the present disclosure will be described herein with reference to the accompanying drawings. However, the embodiments of the present disclosure are not limited to the specific embodiments and should be understood as including all modifications, changes, equivalent devices and methods, and/or alternative embodiments of the present disclosure.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

Figure 1:
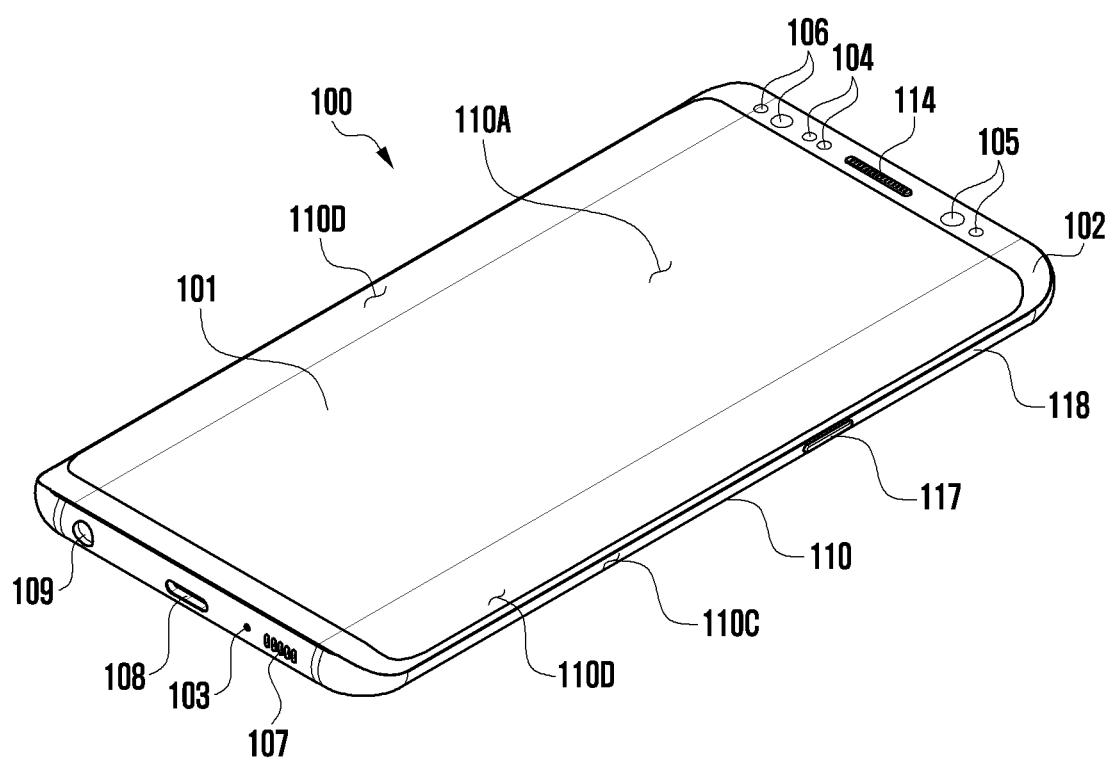
FIG. 1 is a front perspective view of an example mobile electronic device according to an embodiment.
Figure 2:
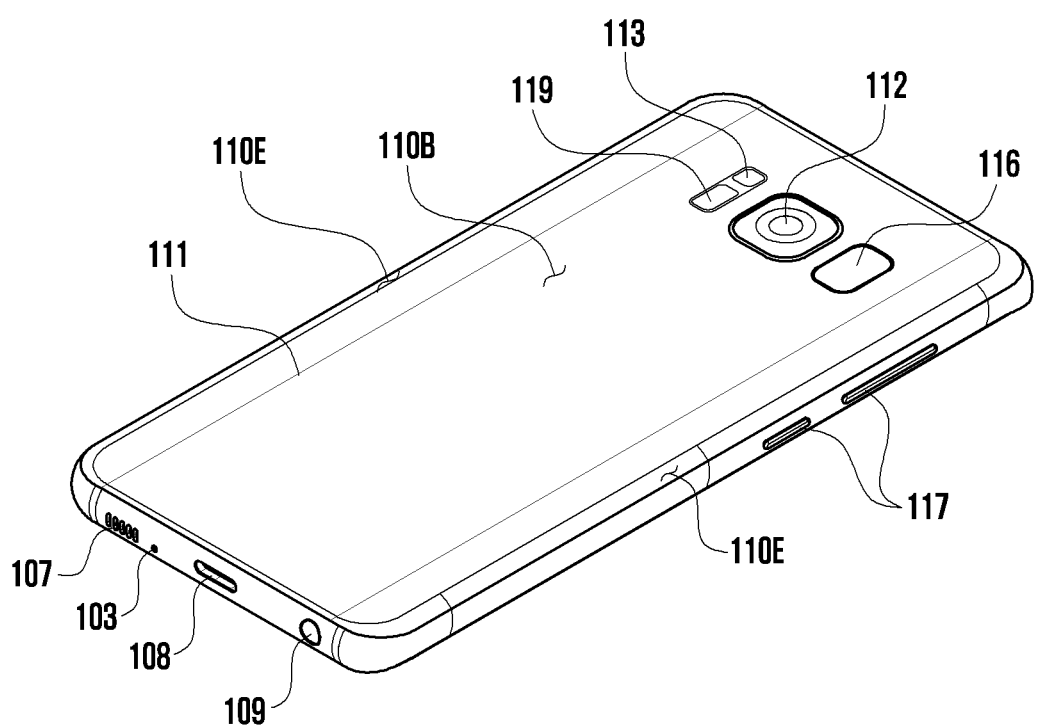
FIG. 2 is a rear perspective view of the example electronic device of FIG. 1 according to an embodiment.

FIG. 1 is a front perspective view of an example mobile electronic device according to an embodiment. FIG. 2 is a rear perspective view of the example electronic device of FIG. 1.

Referring to FIG. 1 and FIG. 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

In the illustrated embodiment, the front plate 102 may include two first areas 110D on both ends of the long edge of the front plate 102 such that the two first areas 110D bend from the first surface 110A toward the rear plate 111 and extend seamlessly. In the illustrated embodiment (see FIG. 2), the rear plate 111 may include two second areas 110E on both ends of the long edge such that the two second areas 110E bend from the second surface 110B toward the front plate 102 and extend seamlessly. In some embodiments, the front plate 102 (or the rear plate 111) may include only one of the first areas 110D (or the second areas 110E). In another embodiment, a part of the first areas 110D or the second areas 110E may not be included. In the above embodiments, when seen from the side surface of the electronic device 100, the side bezel structure 118 may have a first thickness (or width) on a part of the side surface, which does not include the first areas 110D or the second areas 110E as described above, and may have a second thickness that is smaller than the first thickness on a part of the side surface, which includes the first areas 110D or the second areas 110E.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the constituent elements (for example, the key input device 117 or the light-emitting element 106) of the electronic device 100 may be omitted, or the electronic device 100 may additionally include another constituent element.

The display 101 may be exposed through a corresponding part of the front plate 102, for example. In some embodiments, at least a part of the display 101 may be exposed through the front plate 102 that forms the first areas 110D of the side surface 110C and the first surface 110A. In some embodiments, the display 101 may have a corner formed in substantially the same shape as that of the adjacent outer periphery of the front plate 102. In another embodiment (not illustrated), in order to increase the area of exposure of the display 101, the interval between the outer periphery of the display 101 and the outer periphery of the front plate 102 may be formed to be substantially identical.

In another embodiment (not illustrated), a recess or an opening may be formed in a part of the screen display area of the display 101, and at least one of an audio module 114, a sensor module 104, a camera module 105, and a light-emitting element 106 may be included and aligned with the recess or the opening. In another embodiment (not illustrated), on the back surface of the screen display area of the display 101, at least one of an audio module 114, a sensor module 104, a camera module 105, a fingerprint sensor 116, and a light-emitting element 106 may be included. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 104 and 119 and/or at least a part of the key input device 117 may be arranged in the first areas 110D and/or the second areas 110E.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, an HIRIVI sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented in another type, such as a soft key, on the display 101. In some embodiments, the key input device may include a sensor module 116 arranged on the second surface 110B of the housing 110.

The light-emitting element 106 may be arranged on the first surface 110A of the housing 110, for example. The light-emitting element 106 may provide information regarding the condition of the electronic device 100 in a light type, for example. In another embodiment, the light-emitting element 106 may provide a light source that interworks with operation of the camera module 105, for example. The light-emitting element 106 may include, for example, an LED, an IR LED, and a xenon lamp.

The connector holes 108 and 109 may include a first connector hole 108 capable of containing a connector (for example, a USB connector) for transmitting/receiving power and/or data to/from an external electronic device, and/or a second connector hole (for example, an earphone jack) 109 capable of containing a connector for transmitting/receiving an audio signal to/from the external electronic device.

Figure 3:
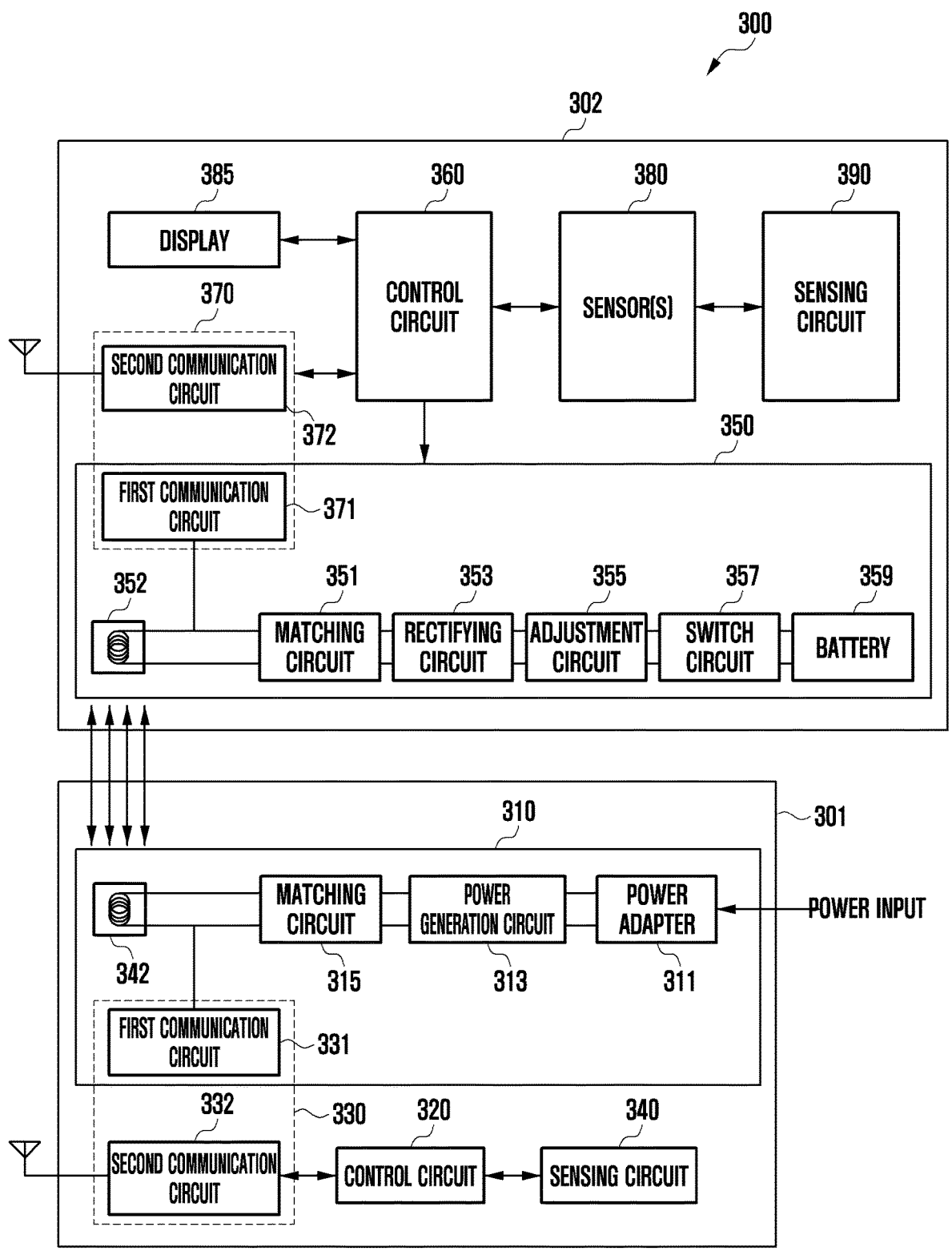
FIG. 3 is a block diagram illustrating an example wireless charging environment of an electronic device and an external electronic device according to various embodiments of the disclosure.

FIG. 3 is a block diagram illustrating an example wireless charging environment 300 of an electronic device and an external electronic device (e.g., watch or earbud) according to various embodiments of the disclosure.

With reference to FIG. 3, an electronic device 301 (e.g., the electronic device 100 of FIG. 1) according to various embodiments of the disclosure may wirelessly transmit power to an external electronic device 302 (e.g., watch, earbud, etc.) to charge the external electronic device 302. The external electronic device 302 may wirelessly receive power.

According to various embodiments, the electronic device 301 may include a power transmission circuit 310, a control circuit 320, a communication circuit 330, and/or a sensing circuit 340.

According to various embodiments, the power transmission circuit 310 may include a power adapter 311 for receiving a power source (or power) from the outside and appropriately converting a voltage of an input power source, a power generation circuit 313 for generating power, and/or a matching circuit 315 for maximizing and/or improving efficiency between a transmission coil 342 and a receiving coil 352.

According to an example embodiment, the power transmission circuit 310 may include a plurality of at least some of the power adapter 311, the power generation circuit 313, the matching circuit 315, and/or the transmission coil 342 so as to enable power transmission to a plurality of external electronic devices (e.g., watch or earbud).

According to an example embodiment, the power transmission circuit 310 may use the power generation circuit 313 to generate a first signal of a first frequency for providing first power to, for example, a watch and a second signal of a second frequency for providing second power to, for example, an earbud. However, it will be understood that the disclosure is not limited thereto.

According to an example embodiment, the control circuit 320 may perform the overall control of the electronic device 301 and generate various messages required for wireless power transmission to transfer the generated messages to the communication circuit 330. In an example embodiment, the control circuit 320 may calculate power (or amount of power) to be transmitted to the external electronic device 302 based on information received from the communication circuit 330. In an example embodiment, the control circuit 320 may control the power transmission circuit 310 such that power calculated by the transmission coil 342 is transmitted to the external electronic device 302.

According to an example embodiment, when the control circuit 320 transfers power to each of a plurality of external electronic devices (e.g., watch and earbud), the control circuit 320 may control the power generation circuit 313 to generate a first signal of a first frequency for providing first power to, for example, a watch and a second signal of a second frequency for providing second power to, for example, an earbud. However, it will be understood that the disclosure is not limited thereto.

According to an example embodiment, the communication circuit 330 may include at least one of a first communication circuit 331 and/or a second communication circuit 332. The first communication circuit 331 may communicate with a first communication circuit 371 of the external electronic device 302 using the transmission coil 342. The first communication circuit 331 may communicate with, for example, an inband method with the first communication circuit 371 of the external electronic device 302 using a frequency equal to or adjacent to that using for power transfer in the transmitting coil 342.

In an example embodiment, the second communication circuit 332 may communicate with, for example, an outband method with a second communication circuit 372 of the external electronic device 302 using a frequency different from that used for power transfer in the transmitting coil 342. For example, the second communication circuit 332 may obtain information (e.g., Vrec information, Tout information, various packets, messages) related to a charge state from the second communication circuit 372 using any one of various short range communication schemes such as, for example, and without limitation, Bluetooth, Bluetooth low energy (BLE), Wi-Fi, near field communication (NFC), or the like.

According to an example embodiment, the sensing circuit 340 may include at least one sensor, and detect at least one state of the external electronic device 302 using at least one sensor.

According to an example embodiment, the sensing circuit 340 may include, for example, and without limitation, at least one of a temperature sensor, a motion sensor, a current (or voltage) sensor, or the like. The temperature sensor may detect a temperature state of the electronic device 301. The motion sensor may detect a motion state of the electronic device 301. The current (or voltage) sensor may detect a state, for example, a current magnitude, a voltage magnitude, or a power magnitude of an output signal of the electronic device 301.

According to an example embodiment, the current (or voltage) sensor may measure a signal in at least a partial area of the power transmission circuit 310. For example, the current (or voltage) sensor may include a circuit for measuring a signal at the front end of the transmitting coil 342. According to an embodiment, the sensing circuit 340 may be a circuit for foreign object detection (FOD).

According to various embodiments, the external electronic device 302 (e.g., watch or earbud) that receives power output from the electronic device 301 may include a power receiving circuit 350, a control circuit 360, a communication circuit 370, at least one sensor 380, a display 385, and/or a sensing circuit 390. According to an embodiment, in the external electronic device 302, a description of a configuration corresponding to the above-described electronic device 301 may not be repeated.

According to various embodiments, the power receiving circuit 350 may include a receiving coil 352 for wirelessly receiving power from the electronic device 301, a matching circuit 351, a rectifying circuit 353 for rectifying received AC power to DC, an adjustment circuit 355 for adjusting a charging voltage, a switch circuit 357, and/or a battery 359.

According to an example embodiment, the control circuit 360 may perform the overall control of the external electronic device 302 and generate various messages required for wireless power reception to transfer the generated various messages to the communication circuit 370.

According to an example embodiment, the communication circuit 370 may include at least one of a first communication circuit 371 and a second communication circuit 372. The first communication circuit 371 may communicate with the electronic device 301 through the receiving coil 352. The second communication circuit 372 may communicate with the electronic device 301 using any one of various short range communication schemes such as, for example, and without limitation, Bluetooth, BLE, Wi-Fi, NFC, or the like.

According to an example embodiment, the at least one sensor 380 may include, for example, and without limitation, at least some of a current/voltage sensor, a temperature sensor, an illuminance sensor, a sound sensor, or the like.

According to an example embodiment, the display 385 may display various display pieces of information required for wireless power transmission and reception.

According to an example embodiment, by detecting a search signal or power received from the electronic device 301, the sensing circuit 390 may detect the electronic device 301. The sensing circuit 390 may receive a signal output from the electronic device 301 through the receiving coil 352 and detect a signal change of an input/output terminal of the matching circuit 351 or the rectifying circuit 353. According to an example embodiment, the sensing circuit 390 may be included in the power receiving circuit 350.

Figure 4:
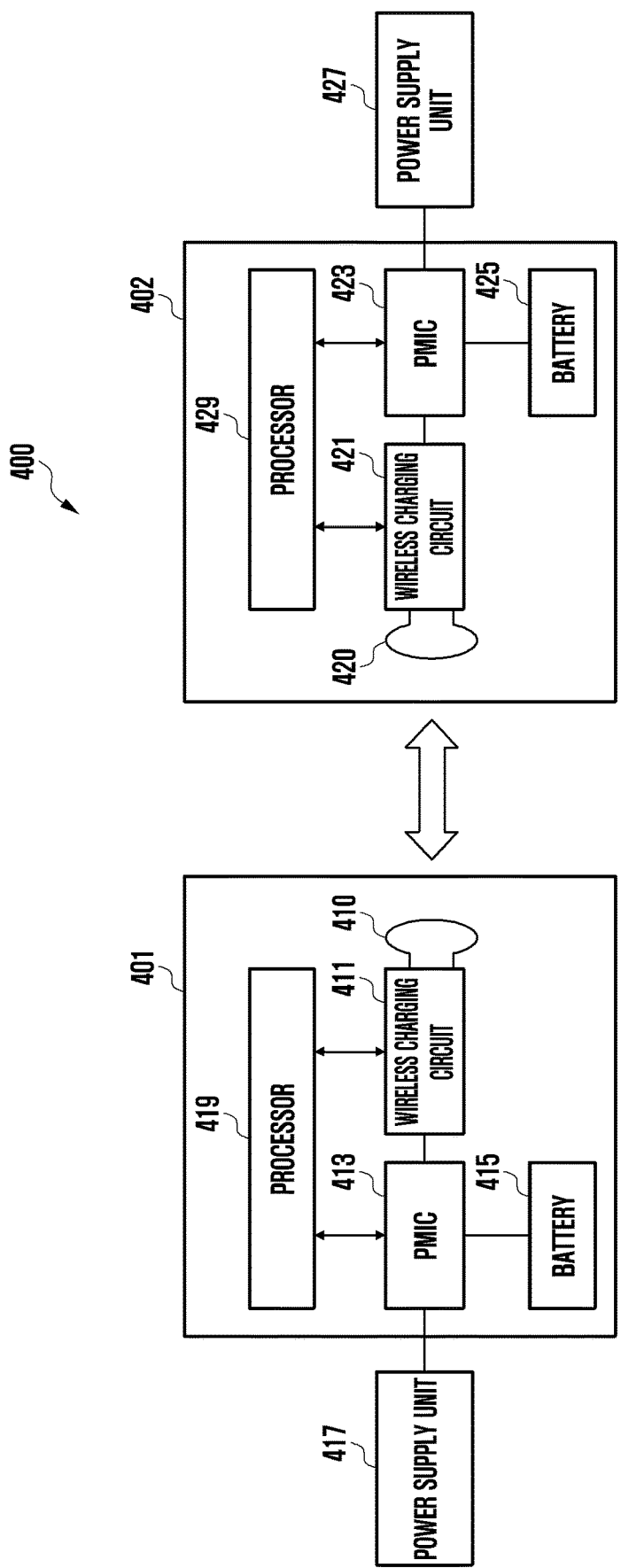
FIG. 4 is a block diagram illustrating an example wireless charging environment of an electronic device and another electronic device according to various embodiments of the disclosure.

FIG. 4 is a block diagram illustrating an example wireless charging environment 400 of an electronic device and another electronic device (e.g., mobile terminal) according to various embodiments of the disclosure.

With reference to FIG. 4, an electronic device 401 (e.g., the electronic device 100 of FIG. 1 or the electronic device 301 of FIG. 3) according to various embodiments of the disclosure may wirelessly transmit and/or receive power to and/or from another electronic device 402.

According to various embodiments, the electronic device 401 and the other electronic device 402 may each include a mobile terminal (e.g., smart phone, etc.). The other electronic device 402 may wirelessly transmit and/or receive power to and/or from the electronic device 401.

According to various embodiments, the electronic device 401 may include a wireless charging coil 410, a wireless charging circuit 411 (e.g., wireless charging transceiver circuit), a power management IC (PMIC) 413, a battery 415, a power supply unit (e.g., a power supply) 417, and a processor (e.g., including processing circuitry) 419.

According to various embodiments, the other electronic device 402 may include a wireless charging coil 420, a wireless charging circuit 421, a PMIC 423, a battery 425, a power supply unit (e.g. a power supply) 427, and a processor (e.g., including processing circuitry) 429 different from the electronic device 401 only in the reference numerals of the drawings and that perform the same function as that of the electronic device 401.

Hereinafter, each function is described based on components of the electronic device 401, and detailed descriptions of components of the other electronic device 402 performing the same functions as those of the components of the electronic device 401 may not be repeated.

According to an example embodiment, the wireless charging coil 410 may be configured in a spiral pattern with a printed circuit board (PCB) interposed therebetween. For example, the wireless charging coil 410 may perform a function corresponding to the transmitting coil 342 and/or the receiving coil 352 of FIG. 3. The wireless charging coil 410 may wirelessly transmit power to the other electronic device 402. The wireless charging coil 410 may wirelessly receive power from another electronic device 402.

According to an example embodiment, the wireless charging circuit 411 may convert electrical energy to a power signal through the wireless charging coil 410 and transmit the power signal to the other electronic device 402.

The wireless charging circuit 411 may convert the power signal received through the wireless charging coil 410 to electrical energy. The wireless charging circuit 411 may provide the converted electrical energy to the PMIC 413. According to an embodiment, the wireless charging circuit 411 may support at least one of various wireless charging schemes including, for example, and without limitation, a magnetic resonance scheme, a magnetic induction scheme, or the like.

According to an example embodiment, the wireless charging circuit 411 may include, for example, at least a portion of a circuit including a function related to the power transmission circuit 310 and the power receiving circuit 350 of FIG. 3. The wireless charging circuit 411 may include, for example, a full bridge circuit. The wireless charging circuit 411 may control the full bridge circuit to be driven by an inverter (DC→AC) in a wireless power transmission operation using the wireless charging coil 410. The wireless charging circuit 411 may control the full bridge circuit to be driven by a rectifier (AC→DC) in a wireless power reception operation using the wireless charging coil 410.

According to an example embodiment, the wireless charging circuit 411 may exchange information necessary for wireless power transmission and reception through inband communication with the other electronic device 402 according to a wireless power consortium (WPC) standard. The inband communication may exchange data between the wireless charging coil 410 and the wireless charging coil 420 through a frequency or amplitude modulation of the wireless power transmission signal in a wireless power transmission situation between the wireless charging coil 410 of the electronic device 401 and the wireless charging coil 420 of the other electronic device 402. According to an embodiment, communication between the electronic device 401 and the other electronic device 402 may exchange information necessary for wireless power transmission and reception through outband communication. The outband communication may use any one of various short range communication methods such as, for example, and without limitation, Bluetooth, BLE, Wi-Fi, NFC, or the like.

According to an example embodiment, after receiving power from the power supply unit 417, the PMIC 413 may charge the battery 415. The PMIC 413 may monitor a charging current and a voltage value supplied to the battery 415. When the battery 415 is fully charged, the PMIC 413 may provide information indicating that the battery 415 has been fully charged to the processor 419.

According to an example embodiment, the PMIC 413 may perform a function of charging power input from the power supply unit 417 to the battery 415 through a wired or wireless means, a function of communicating with an external power supply unit 417 connected through an external terminal (e.g., USB terminal), a function of supplying power required for the electronic device 401, a function of supplying power corresponding to a voltage level required for an element such as the wireless charging circuit 411 or the processor 419, or a function of supplying power to the wireless charging circuit 411 in a wireless power transmission mode.

According to an example embodiment, the battery 415 may receive power supplied from the power supply unit 417 or power supplied from the other electronic device 402 using the PMIC 413. The battery 415 may be a device for supplying power to at least one component of the electronic device 401 and may include, for example, and without limitation, a non-rechargeable primary cell, a rechargeable secondary cell, a fuel cell, or the like. The battery 415 may be integrally disposed inside the electronic device 401 or may be detachably attached to the electronic device 401.

According to an example embodiment, the power supply unit 417 may supply power required for the electronic device 401. The power supply unit 417 may supply power to the electronic device 401 through a travel adapter (TA) or a universal serial bus (USB). The power supply unit 417 may include an external connection terminal capable of supporting an interface such as USB charging or on the go (OTG) power supply.

According to an example embodiment, the processor 419 may include various processing circuitry and be electrically connected to at least one of the wireless charging coil 410, the wireless charging circuit 411, the PMIC 413, the battery 415, or the power supply 417 inside the electronic device 401 to perform the overall control of the electronic device 401. The processor 419 may generate various messages required to wirelessly transmit or receive power to and from the other electronic device 402. The processor 419 may calculate power (or amount of power) to be transmitted to the other electronic device 402.

According to an example embodiment, when the electronic device 401 is in contact with or adjacent (as used herein, the term "adjacent" is not limited to being directly adjacent, but may include being within a specified power transmission distance) to the other electronic device 402 (e.g., smartphone) or an external electronic device (e.g., watch or earbud) of FIG. 3, the processor 419 may control the electronic device 401 to wirelessly transmit power stored in the battery 415 using the wireless charging coil 410 and the wireless charging circuit 411. When the electronic device 401 is in contact with or adjacent to the other electronic device 402, the processor 419 may wirelessly receive power using the wireless charging coil 410.

Figure 5:
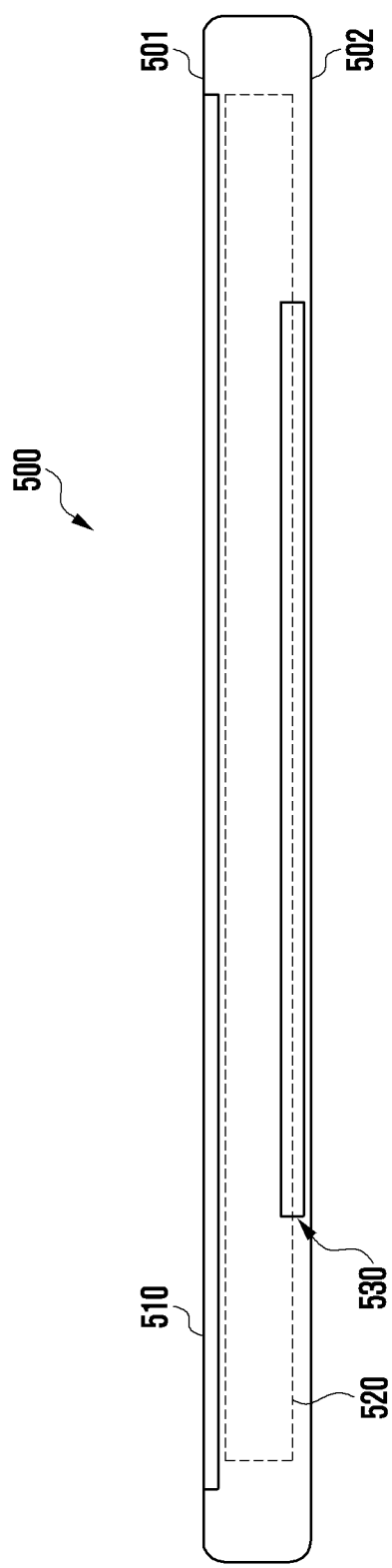
FIG. 5 is a diagram illustrating example disposition of a wireless charging coil inside an electronic device according to various embodiments of the disclosure.

FIG. 5 is a diagram illustrating an example disposition of a wireless charging coil inside an electronic device according to various embodiments of the disclosure.

With reference to FIG. 5, an electronic device 500 according to various embodiments of the disclosure may include a display 510, a printed circuit board 520, and a wireless charging coil 530.

According to various embodiments, the electronic device 500 may include the electronic device 100 of FIG. 1, the electronic device 301 of FIG. 3, or the electronic device 401 of FIG. 4. The display 510 may include the display 101 of FIG. 1 or the display 385 of FIG. 3. The wireless charging coil 530 may include the wireless charging coil 410 of FIG. 4.

According to an example embodiment, the display 510 may be exposed through at least a partial region of a front plate 501 (e.g., the front plate 102 of FIG. 1) of the electronic device 500.

According to an example embodiment, in the printed circuit board 520, the wireless charging circuit 411, the PMIC 413, the power supply unit 417, and the processor 419 of FIG. 4 may be mounted. According to an embodiment, a battery (e.g., the battery 415 of FIG. 4) may be disposed on substantially the same plane as the printed circuit board 520.

According to an example embodiment, the wireless charging coil 530 may be disposed adjacently inside a rear plate 502 (e.g., the rear plate 111 of FIG. 1) of the electronic device 500. The wireless charging coil 530 may wirelessly transmit and/or receive power.

Figure 6:
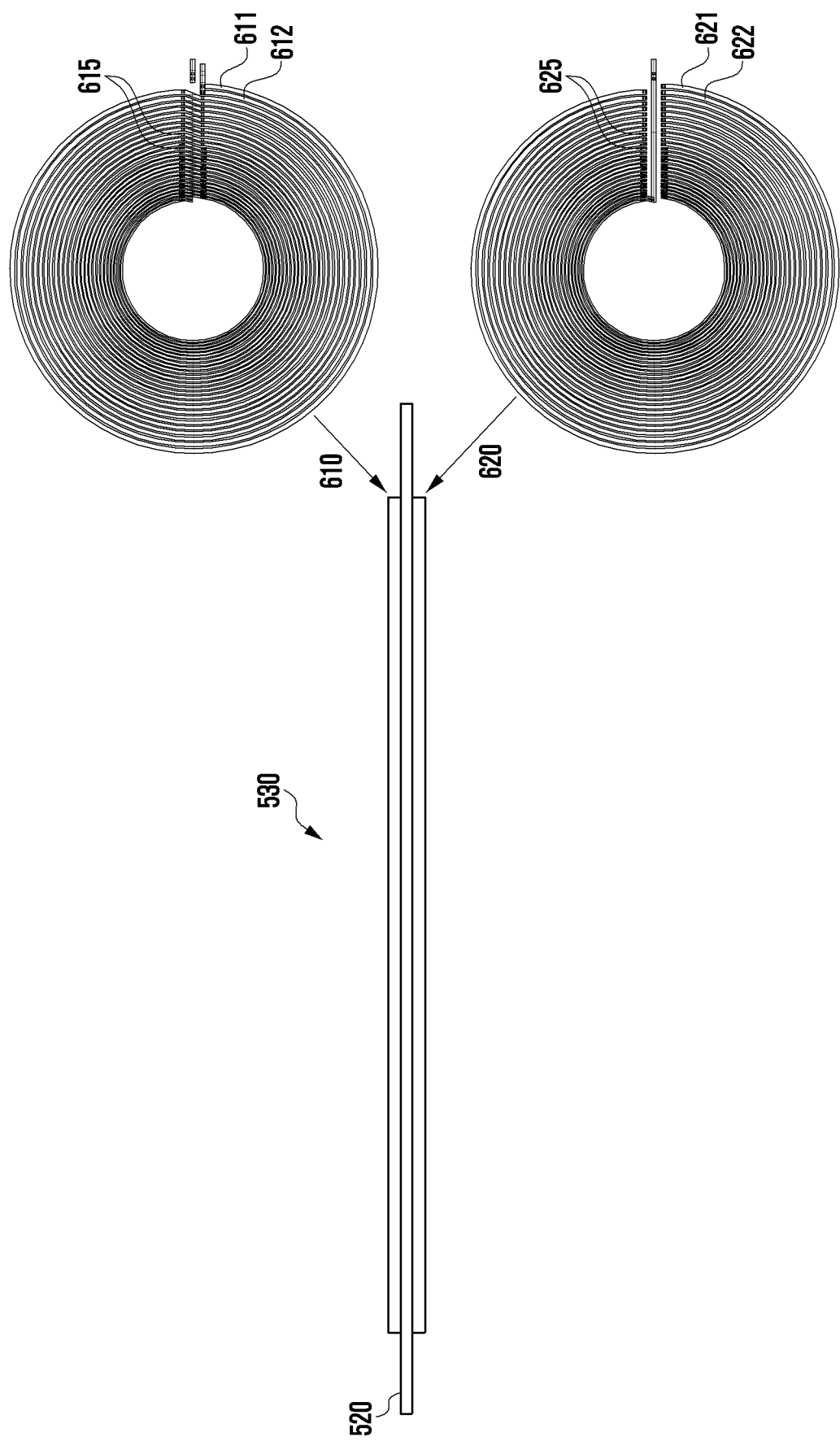
FIG. 6 is a diagram illustrating an example configuration of a wireless charging coil according to various embodiments of the disclosure.

FIG. 6 is a diagram illustrating an example configuration of a wireless charging coil according to various embodiments of the disclosure.

With reference to FIG. 6, the wireless charging coil 530 according to various embodiments of the disclosure may include a first coil pattern portion 610 and a second coil pattern portion 620 with a printed circuit board 520 interposed therebetween.

According to various embodiments, the wireless charging coil 530 may wirelessly transmit power to another electronic device (e.g., smart phone, watch or earbud). The wireless charging coil 530 may wirelessly receive power from another electronic device (e.g., the wireless charging pad or the other electronic device 402 of FIG. 4).

According to an example embodiment, the printed circuit board 520 may include, for example, a plastic substrate made, for example, and without limitation, of at least one of polyimide, polymethylmethacrylate, polyamide, polypropylene, polyurethane, or the like.

According to an example embodiment, the first coil pattern portion 610 may be disposed on the printed circuit board 520 (e.g., on a first side of the printed circuit board). The first coil pattern portion 610 may include a plurality of patterns in which a 1-1 (e.g., first first coil) pattern 611 and a 1-2 (e.g., second first coil) pattern 612 are wound in a spiral shape. The first coil pattern portion 610 may include at least one first through-hole 615 at a predetermined position. According to various embodiments, the first coil pattern portion 610 may perform a function corresponding to, for example, the transmitting coil 342 or the receiving coil 352 of FIG. 3.

According to an example embodiment, the second coil pattern portion 620 may be disposed beneath the printed circuit board 520 (e.g., on a second side of the printed circuit board opposite the first side). The second coil pattern portion 620 may include a plurality of patterns in which a 2-1 (e.g., first second coil) pattern 621 and a 2-2 (e.g., second second coil) pattern 622 are wound in a helical shape, but in which a partial area is short-circuited. The 2-1 pattern 621 and the 2-2 pattern 622 may be alternately disposed. According to an embodiment, the second coil pattern portion 620 may include a spiral-shaped 2-1 pattern 621 and 2-2 pattern 622 in which a partial region is short-circuited. According to an embodiment, the second coil pattern portion 620 may include at least one second patterns 621 and 622 whose at least a portion is formed to overlap in the 1-1 pattern or the 1-2 pattern. The second coil pattern portion 620 may include at least one second through-hole 625 at a predetermined position. According to various embodiments, the second coil pattern portion 620 may perform a function corresponding to, for example, the transmitting coil 342 or the receiving coil 352 of FIG. 3.

According to various embodiments, the first coil pattern portion 610 and the second coil pattern portion 620 may be electrically connected to each other through both the first through-hole 615 and the second through-hole 625.

Figure 7:
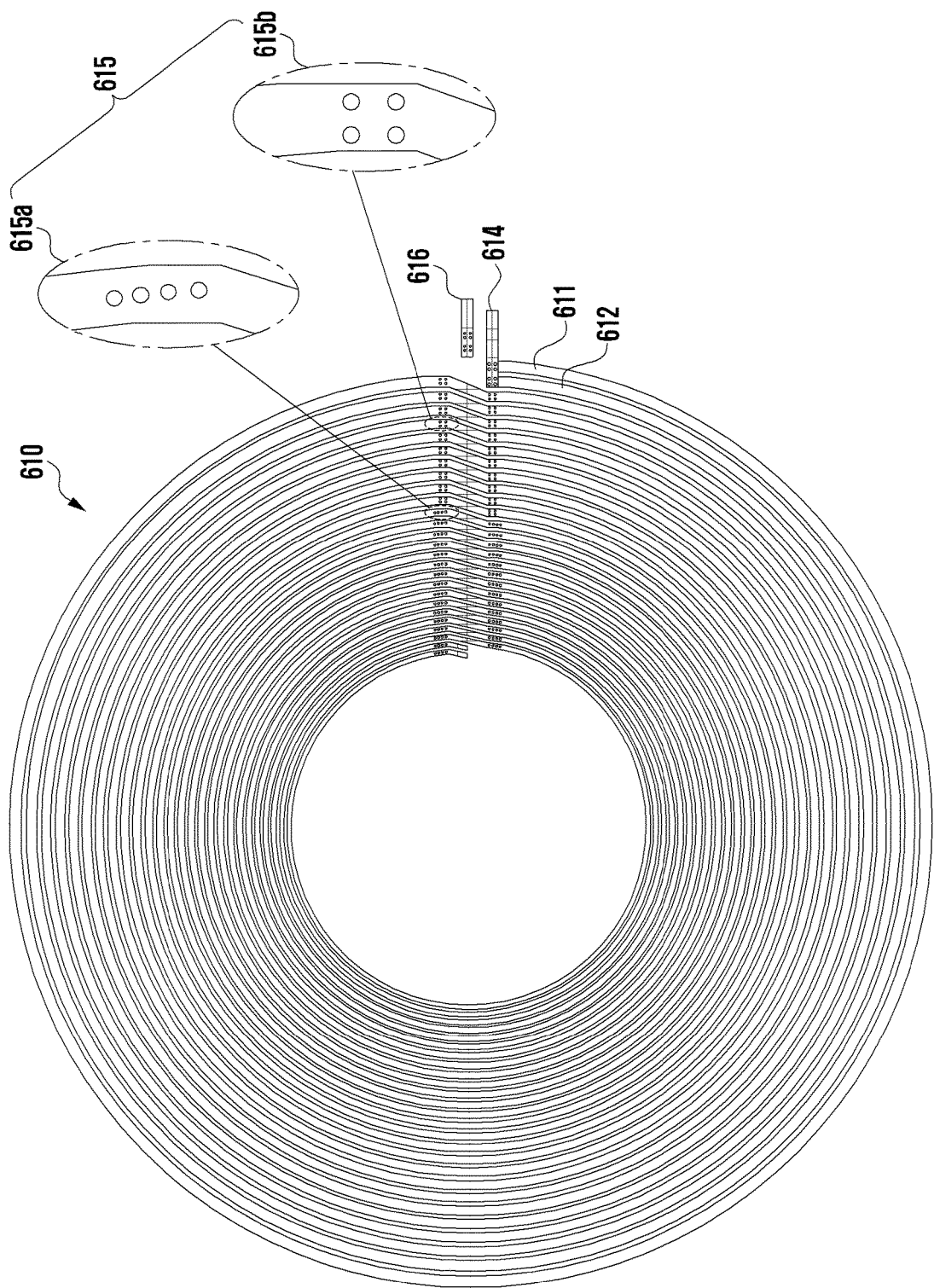
FIG. 7 is a diagram illustrating an example configuration of a first coil pattern portion according to various embodiments of the disclosure.

FIG. 7 is a diagram illustrating an example configuration of a first coil pattern portion according to various embodiments of the disclosure.

With reference to FIG. 7, the first coil pattern portion 610 according to various embodiments of the disclosure may include a pattern in which a 1-1 (e.g., a first first coil) pattern 611 and a 1-2 (e.g., a second first coil) pattern 612 are wound a plurality of times in a spiral shape.

According to an example embodiment, for example, when it is assumed that a first pattern from the outside is a first turn, the 1-1 pattern 611 may correspond to the turn include a first turn, third turn, fifth turn, seventh turn, . . . , n-th turn. The 1-2 pattern 612 may correspond to a second turn, fourth turn, sixth turn, eighth turn, . . . , n-th turn.

According to an example embodiment, a first connection terminal 614 may be connected to the outer ends of the 1-1 pattern 611 and the 1-2 pattern 612. The first connection terminal 614 may be electrically connected to, for example, the wireless charging circuit 411 of FIG. 4 or the power transmission circuit 310 or the power receiving circuit 350 of FIG. 3.

According to an example embodiment, a second connection terminal 616 may be connected to inner ends of the 1-1 pattern 611 and the 1-2 pattern 612. For example, the second connection terminal 616 may be electrically connected to the wireless charging circuit 411 of FIG. 4.

According to an example embodiment, a width of the 1-1 pattern 611 may gradually decrease from the outside to an inside direction. For example, a width of the 1-1 pattern 611 may be configured to gradually decrease inward, as in a width of the first turn≥a width of the third turn≥a width of the fifth turn≥a width of the seventh turn≥a width of the n-th turn.

According to an example embodiment, a width of the 1-2 pattern 612 may gradually decrease from the outside to an inside direction. For example, the width of the 1-2 pattern 612 may be configured to decrease as advancing inward, as in a width of the second turn≥a width of the fourth turn≥a width of the sixth turn≥a width of the eighth turn≥a width of the nth turn.

According to an example embodiment, a width of the 1-1 pattern 611 and 1-2 pattern 612 having the same width may be configured to equally decrease from the outside to an inside direction, as in the width of the first turn=the width of the second turn>the width of the third turn=the width of the fourth turn>the fifth turn=the width of the sixth turn>the width of the seventh turn=the width of the eighth turn. According to an embodiment, the electronic device 500 according to various embodiments of the disclosure may wind the 1-1 pattern 611 and the 1-2 pattern 612 in one set to improve current distribution of the wireless charge coil 530, to reduce equivalent series resistance (ESR) and parasitic capacitance, and to reduce heat generation.

According to an example embodiment, at least one through-hole 615 may be formed at predetermined positions of the 1-1 pattern 611 and the 1-2 pattern 612, the first connection terminal 614, and the second connection terminal 616.

According to an example embodiment, the through-hole 615 may include at least one 1-1 through-hole 615a in which a plurality of holes is aligned in a row. The through-hole 615 may include at least one 1-2 through-hole 615b in which a plurality of holes are aligned in a plurality of rows.

Figure 8:
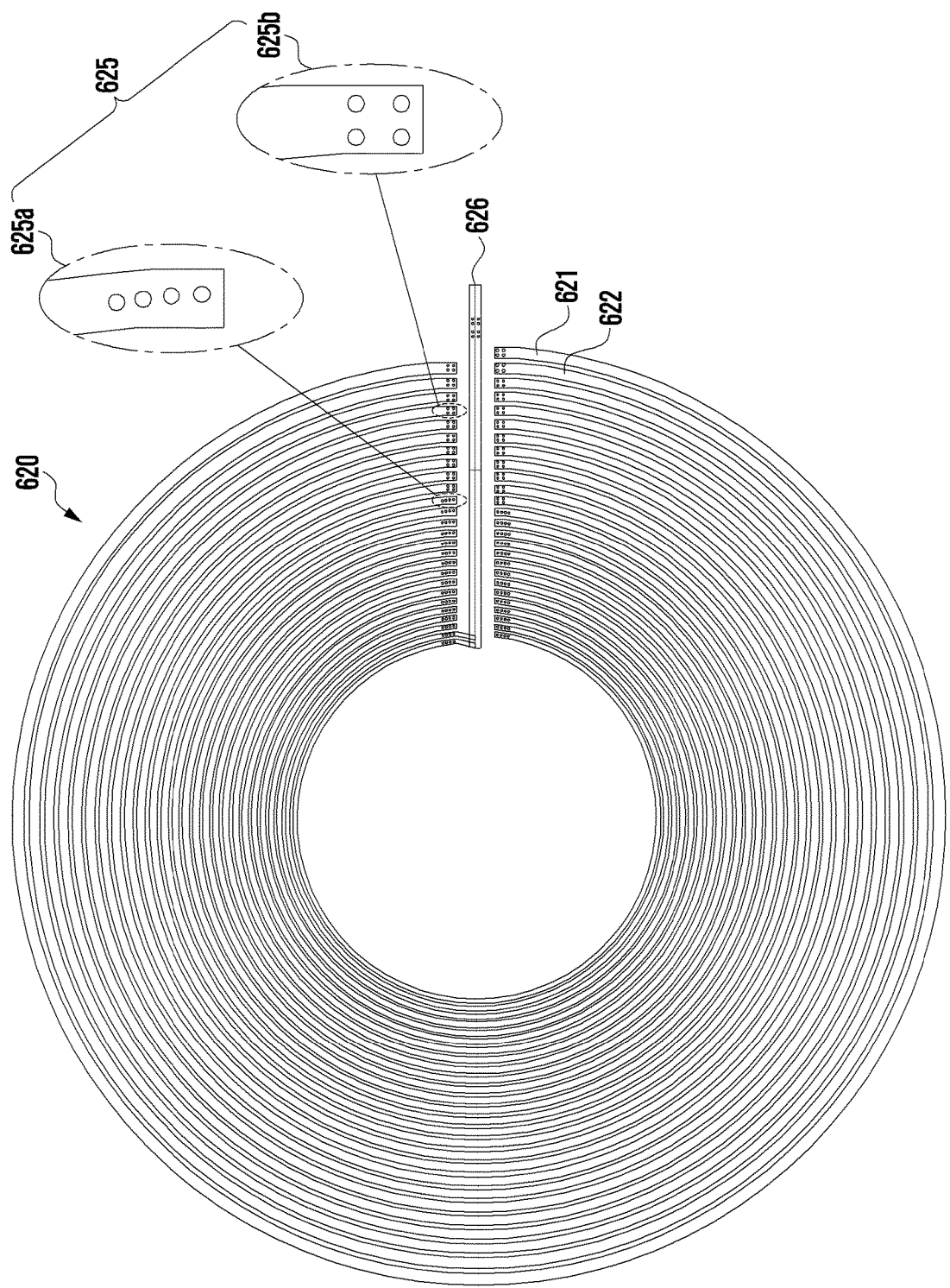
FIG. 8 is a diagram illustrating an example configuration of a second coil pattern portion according to various embodiments of the disclosure.

FIG. 8 is a diagram illustrating an example configuration of a second coil pattern portion according to various embodiments of the disclosure.

With reference to FIG. 8, the second coil pattern portion 620 according to various embodiments of the disclosure may include a pattern in which a 2-1 (e.g., first second coil) pattern 621 and a 2-2 (e.g., second second coil) pattern 622 are wound a plurality of times in a helical shape, and having a partial area that is short-circuited.

In the second coil pattern portion 620 according to various embodiments of the disclosure, the 2-1 pattern 621 and the 2-2 pattern 622 may be alternately disposed. According to an embodiment, the second coil pattern portion 620 may include spiral-shaped 2-1 patterns 621 and 2-2 patterns 622 whose partial region is short-circuited. According to an embodiment, the second coil pattern portion 620 may include at least one of two patterns 621 and 622 whose at least a portion is formed to overlap in the 1-1 pattern 611 or the 1-2 pattern 612.

According to an example embodiment, a third connection terminal 626 may be connected to at least a portion of the inner ends of the 2-1 pattern 621 and the 2-2 pattern 622. For example, the third connection terminal 626 may be electrically connected to the second connection terminal 616 or the wireless charging circuit 411 of FIG. 4. The third connection terminal 626 may be connected to a partial area of the 2-1 pattern 621 or the 2-2 pattern 622 and be spaced apart from the remaining areas.

According to an example embodiment, at least one through-hole 625 may be formed at a predetermined position of the 2-1 pattern 621, the 2-2 pattern 622, and the third connection terminal 626.

According to an example embodiment, a through-hole 655 may include at least one 2-1 through-hole 625a in which a plurality of holes are aligned in a row. The through-hole 625 may include at least one 2-2 through-hole 625b in which a plurality of holes are aligned in a plurality of rows.

According to an example embodiment, the second coil pattern portion 620 may gradually decrease in width from the outside toward an inside direction. For example, a width of the second coil pattern portion 620 may be configured to decrease as advancing inward, as in a width of the first turn≥a width of the second turn≥a width of the third turn≥a width of the fourth turn≥a width of the nth turn.

According to various embodiments, the first coil pattern portion 610 and the second coil pattern portion 620 may be electrically connected to each other through a 1-1 through-hole 615a and a 1-2 through-hole 615b formed in the first coil pattern portion 610 and a 2-1 through-hole 625a and a 2-2 through-hole 625b formed in the second coil pattern portion 620.

Figure 9:
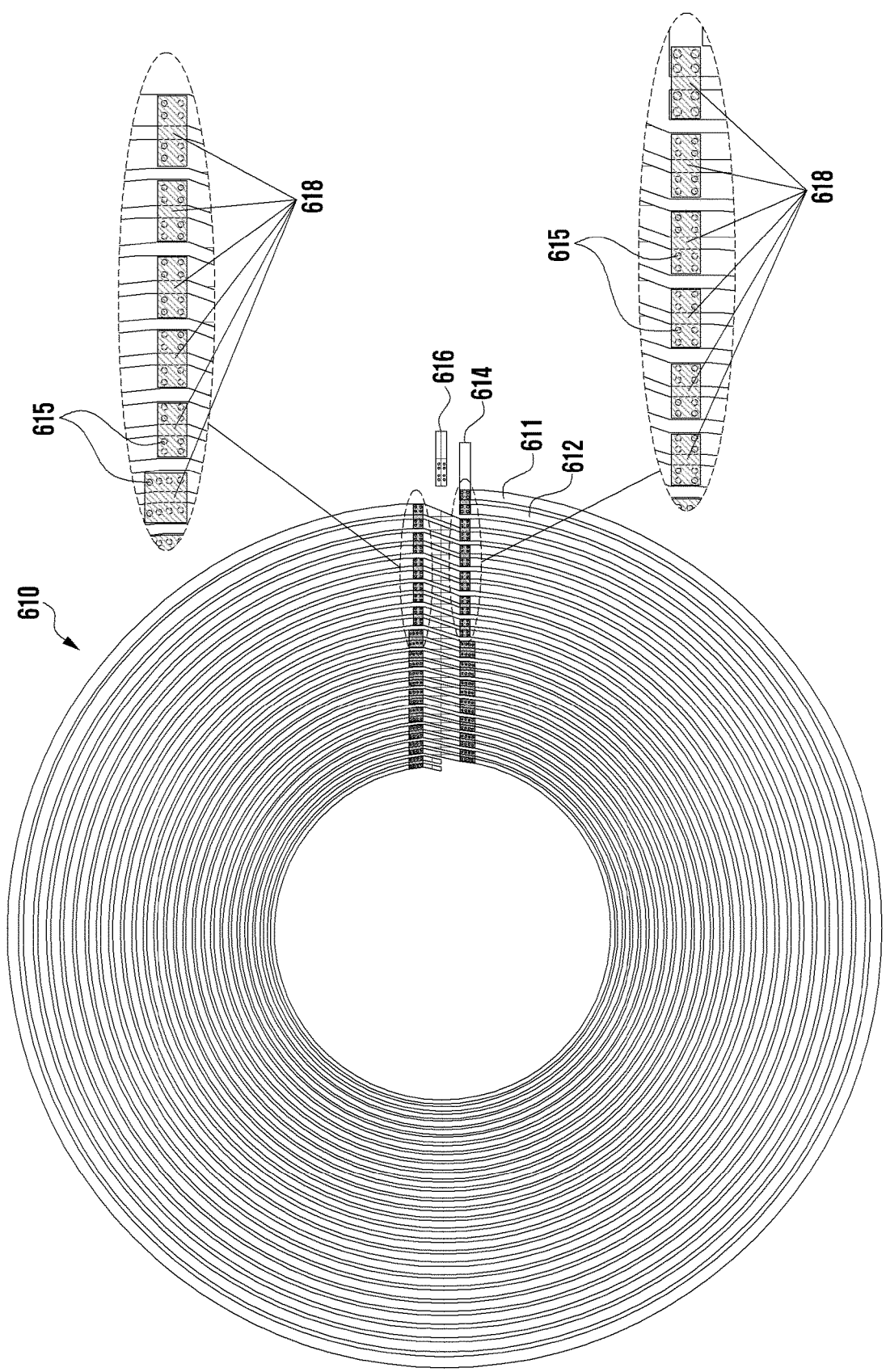
FIG. 9 is a diagram illustrating another example configuration of a first coil pattern portion according to various embodiments of the disclosure.

FIG. 9 is a diagram illustrating another example configuration of a first coil pattern portion according to various embodiments of the disclosure.

With reference to FIG. 9, the first coil pattern portion 610 according to various embodiments of the disclosure may include a pattern in which the 1-1 (e.g., first first coil) pattern 611 and the 1-2 (e.g., second first coil) pattern 612 are wound a plurality of times in a spiral shape.

According to an example embodiment, the 1-1 pattern 611 and the 1-2 pattern 612 may be electrically connected to each other through a connection portion 618 near the through-hole 615. For example, when the first pattern (e.g., the 1-1 pattern 611) of the first coil pattern portion 610 is a first turn, and when the second pattern (e.g., the 1-2 pattern 612) thereof is a second turn, the first and second turns, the third and fourth turns, and the fifth and sixth turns of the first coil pattern portion 610 may be electrically connected through the connecting portion 618.

According to an example embodiment, the connection portion 618 may be formed only in the first coil pattern portion 610 and may not be formed in the second coil pattern portion 620.

According to an example embodiment, although it has been described that the connection portion 618 is formed between every turn, the connection portion 618 may be formed only in a part of every turn. For example, the connection portion 618 may be formed in the first and second turns of the 1-1 pattern 611 and the 1-2 pattern, and may not be formed in the third and fourth turns.

Figure 10:
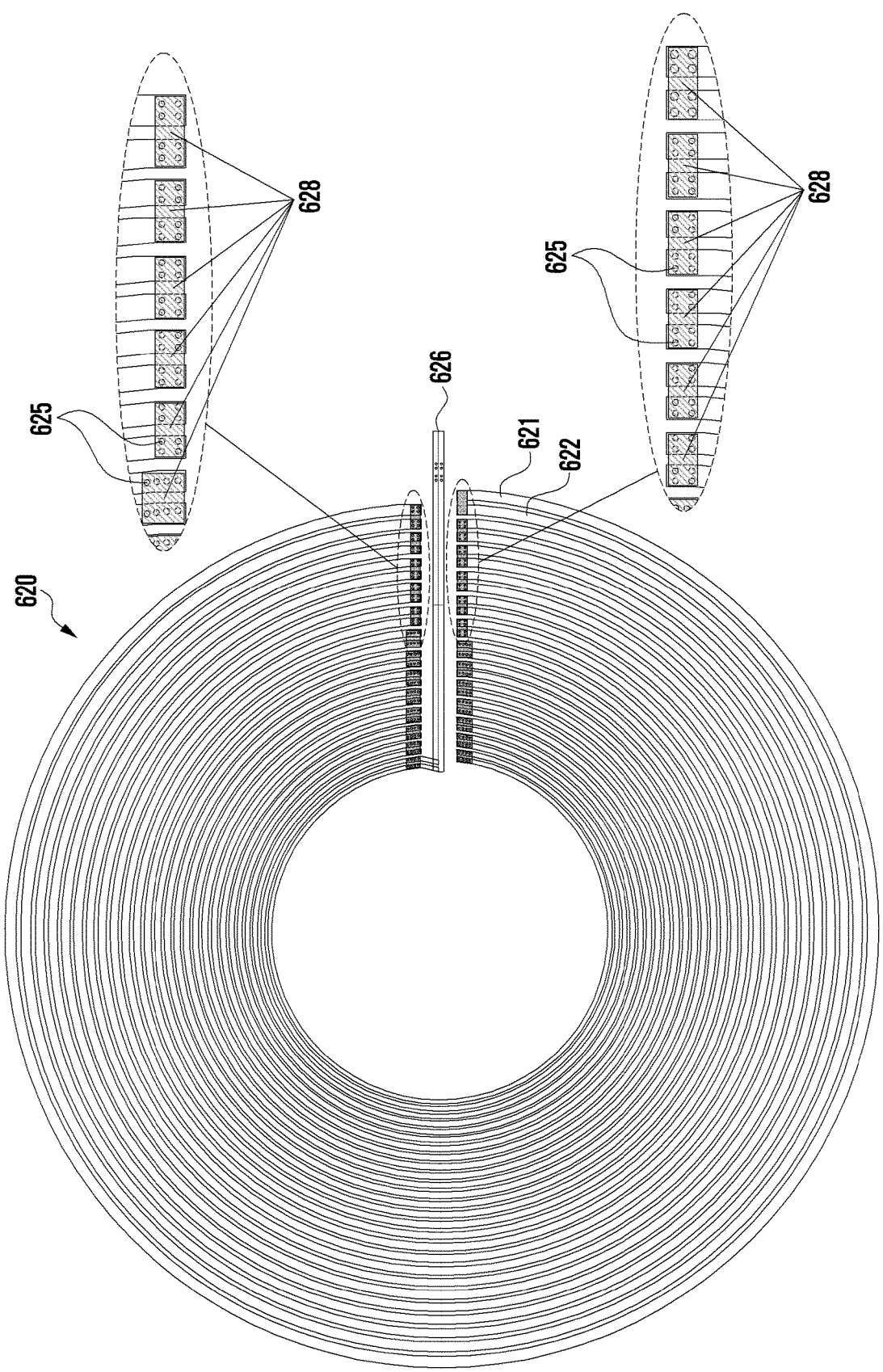
FIG. 10 is a diagram illustrating another example configuration of a second coil pattern portion according to various embodiments of the disclosure.

FIG. 10 is a diagram illustrating another example configuration of a second coil pattern portion according to various embodiments of the disclosure.

With reference to FIG. 10, the second coil pattern portion 620 according to various embodiments of the disclosure may include a pattern in which the 2-1 (e.g., first second coil) pattern 621 and the 2-2 (e.g., second second coil) pattern 622 are wound a plurality of times in a helical shape, but whose partial area is short-circuited.

According to an example embodiment, the 2-1 pattern 621 and the 2-2 pattern 622 may be electrically connected to each other through the connection portion 628 near the through-hole 625. For example, when the first pattern (e.g., the 2-1 pattern 621) of the second coil pattern portion 620 is a first turn, and when the second pattern (e.g., the 2-2 pattern 622) thereof is a second turn, the first and second turns, the third and fourth turns, and the fifth and sixth turns of the second coil pattern portion 620 may be electrically connected through the connecting portion 628.

According to an example embodiment, the connection portion 628 may be formed only in the second coil pattern portion 620 and may not be formed in the first coil pattern portion 610. Although it has been described that the connection portion 628 is formed between every turn, the connection portion 628 may be formed only in a part between every turn.

Figure 11:
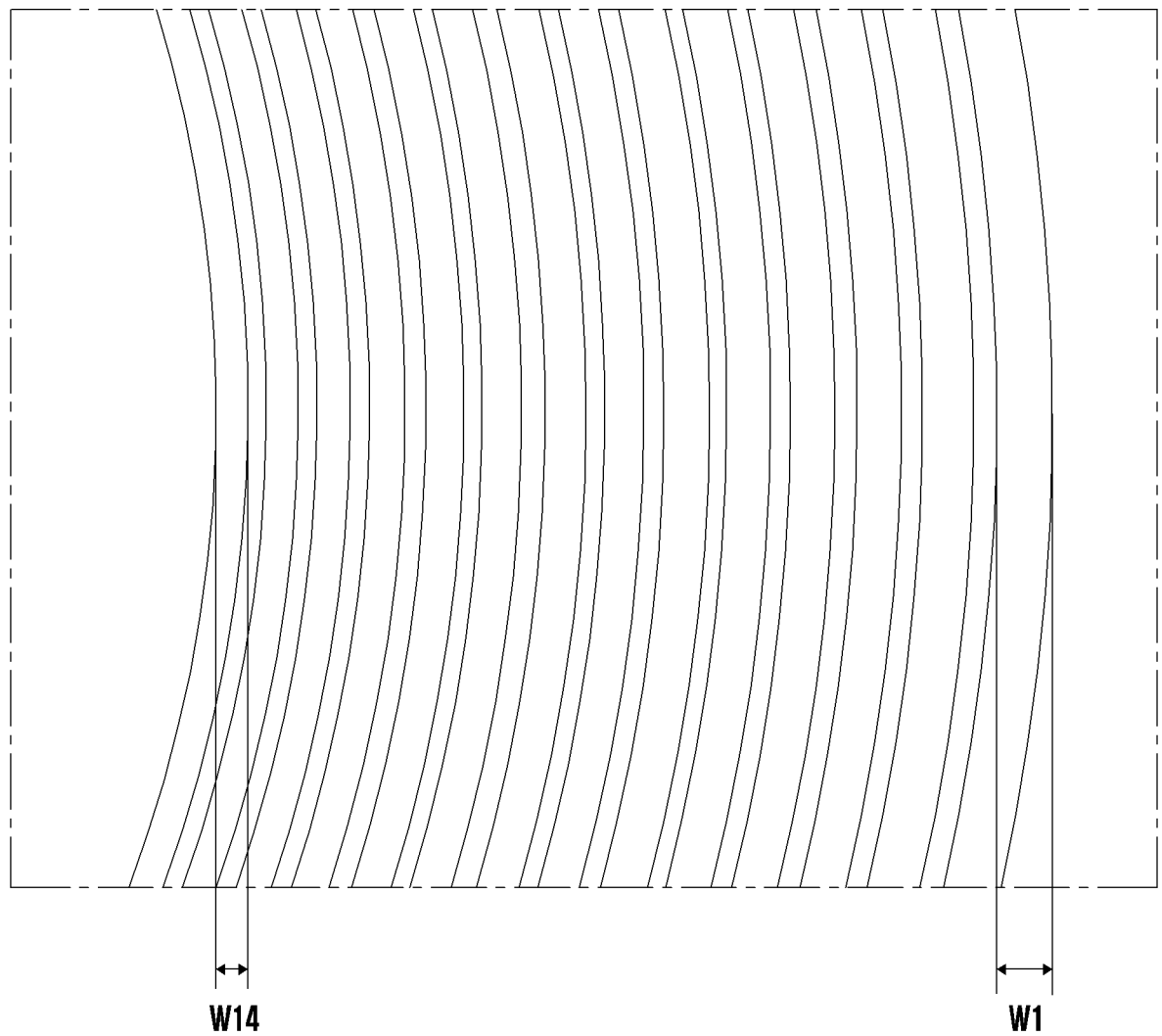
FIG. 11 is a diagram illustrating an example width of a first coil pattern portion and a second coil pattern portion according to various embodiments of the disclosure.

FIG. 11 is a diagram illustrating an example width of a first coil pattern portion and a second coil pattern portion according to various embodiments of the disclosure.

With reference to FIG. 11, each of the first coil pattern portion 610 and the second coil pattern portion 620 according to various embodiments of the disclosure may gradually decrease in width from the outside to an inside direction.

For example, a width W1 of a first turn of the first coil pattern portion 610 or the second pattern portion 620 may, for example and without limitation, be about 1.3 mm, and a width W14 of a fourteenth turn thereof may, for example, and without limitation be about 0.55 mm.

According to an example embodiment, widths corresponding to the first turn to the fourteenth turn may, for example, and without limitation, be designed as illustrated in Table 1.

TABLE 1

| Turn | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Width (mm) | 1.3 | 1.2 | 1.15 | 1.1 | 1.05 | 1 | 0.95 | 0.9 | 0.85 | 0.8 | 0.7 | 0.65 | 0.6 | 0.55 | the 1-1 pattern 611) of the first coil pattern portion 610 is a first turn, and when the second pattern (e.g., the 1-2 pattern 612) thereof is a second turn, the first and second turns, the third and fourth turns, and the fifth and sixth turns of the first coil pattern portion 610 may be electrically connected through the connecting portion 618.

According to an example embodiment, the connection portion 618 may be formed only in the first coil pattern portion 610 and may not be formed in the second coil pattern portion 620.

Figure 12:
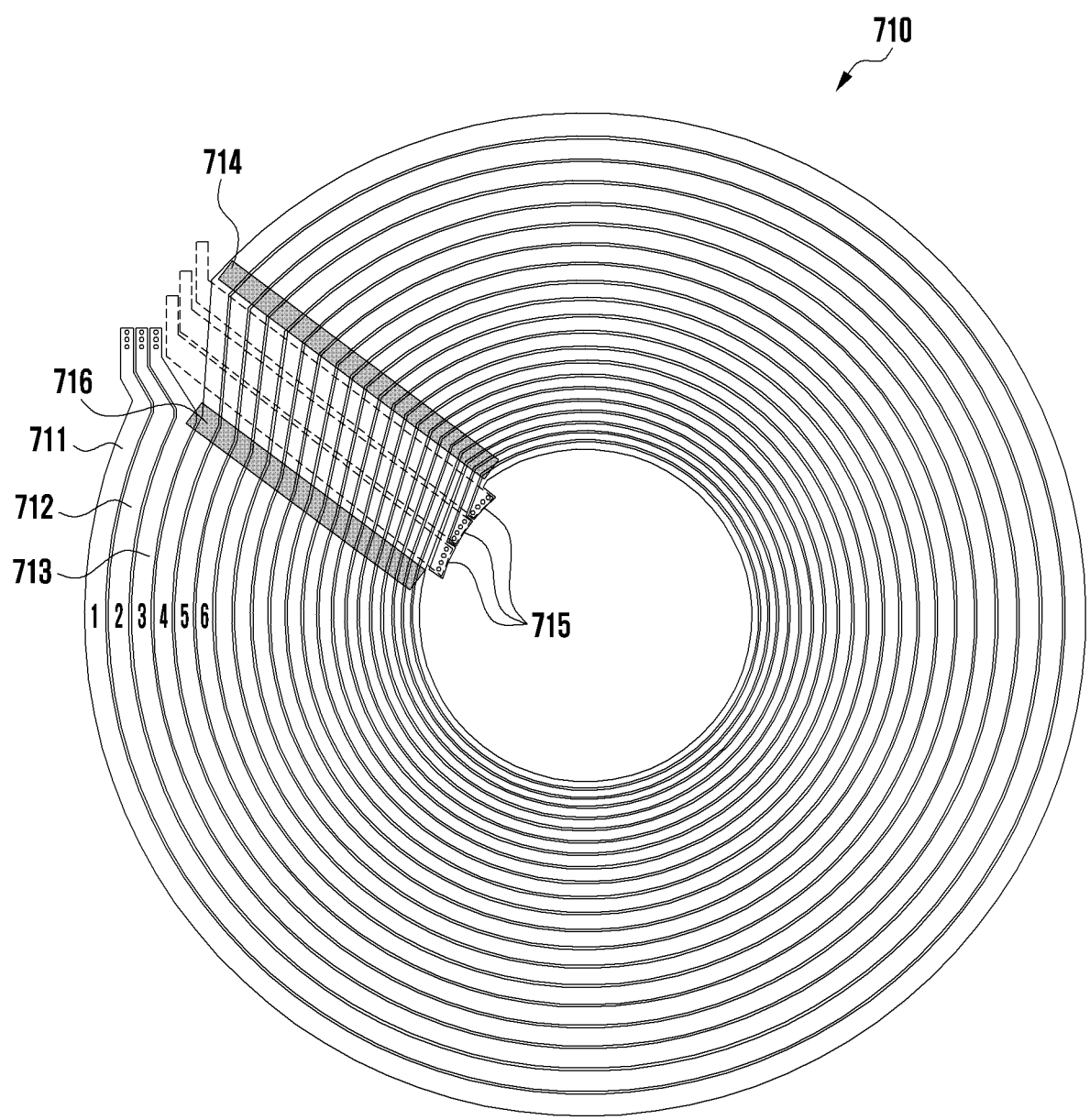
FIG. 12 is a diagram illustrating another example configuration of a first coil pattern portion according to various embodiments of the disclosure.

According to an example embodiment, although it has been described that the connection portion 618 is formed FIG. 12 is a diagram illustrating another example configuration of a first coil pattern portion according to various embodiments of the disclosure.

With reference to FIG. 12, a first coil pattern portion 710 according to various embodiments of the disclosure may include a pattern in which a 3-1 pattern 711, a 3-2 pattern 712, and a 3-3 pattern 713 are wound a plurality of times in a spiral shape.

According to an example embodiment, the 3-1 pattern 711 may include a first turn 1 and a fourth turn 4. The 3-2 pattern 712 may include a second turn 2 and a fifth turn 5. The 3-3 pattern 713 may include a third turn 3 and a sixth turn 6.

According to an example embodiment, a first turn 1 of the 3-1 pattern 711, a second turn 2 of the 3-2 pattern 712, and a third turn 3 of the 3-3 pattern 713 may have a thickness greater than that of a fourth turn 4 of the 3-1 pattern 711, a fifth turn 5 of the 3-2 pattern 712, and a sixth turn 6 of the 3-3 pattern 713. For example, widths of each of the 3-1 pattern 711, the 3-2 pattern 712, and the 3-3 pattern 713 disposed outside the first coil pattern portion 710 may be configured to decrease as advancing inward.

According to an example embodiment, a first connection terminal 714 (not illustrated) may be connected to the outer ends of the 3-1 pattern 711, the 3-2 pattern 712, and the 3-3 pattern 713. For example, the first connection terminal 714 may be electrically connected to the wireless charging circuit 411 of FIG. 4 or the power transmission circuit 310 or the power receiving circuit 350 of FIG. 3.

According to an example embodiment, a second connection terminal 716 may be connected to the inner ends of the 3-1 pattern 711, the 3-2 pattern 712, and the 3-3 pattern 713. For example, the second connection terminal 716 may be electrically connected to the wireless charging circuit 411 of FIG. 4 or the power transmission circuit 310 or the power receiving circuit 350 of FIG. 3.

According to an example embodiment, the first connection terminal 714 may include a region in which a through-hole 715 is formed.

According to an example embodiment, at least one through-hole 715 may be formed at predetermined positions of the 3-1 pattern 711, the 3-2 pattern 712, and the 3-3 pattern 713.

According to an example embodiment, the second connection terminal 716 may include a region in which the through-hole 715 is formed. The second connection terminal 716 may electrically connect the 3-1 pattern 711, the 3-2 pattern 712, and the 3-3 pattern 713 using the through-hole 715. The second connection terminal 716 may be disposed at a surface different from that of the first connection terminal 714.

According to an example embodiment, the through-hole 715 may include at least one through-hole in which a plurality of holes is aligned in a row. The through-hole 715 may include at least one through-hole in which a plurality of holes is arranged in a plurality of rows.

Figure 13:
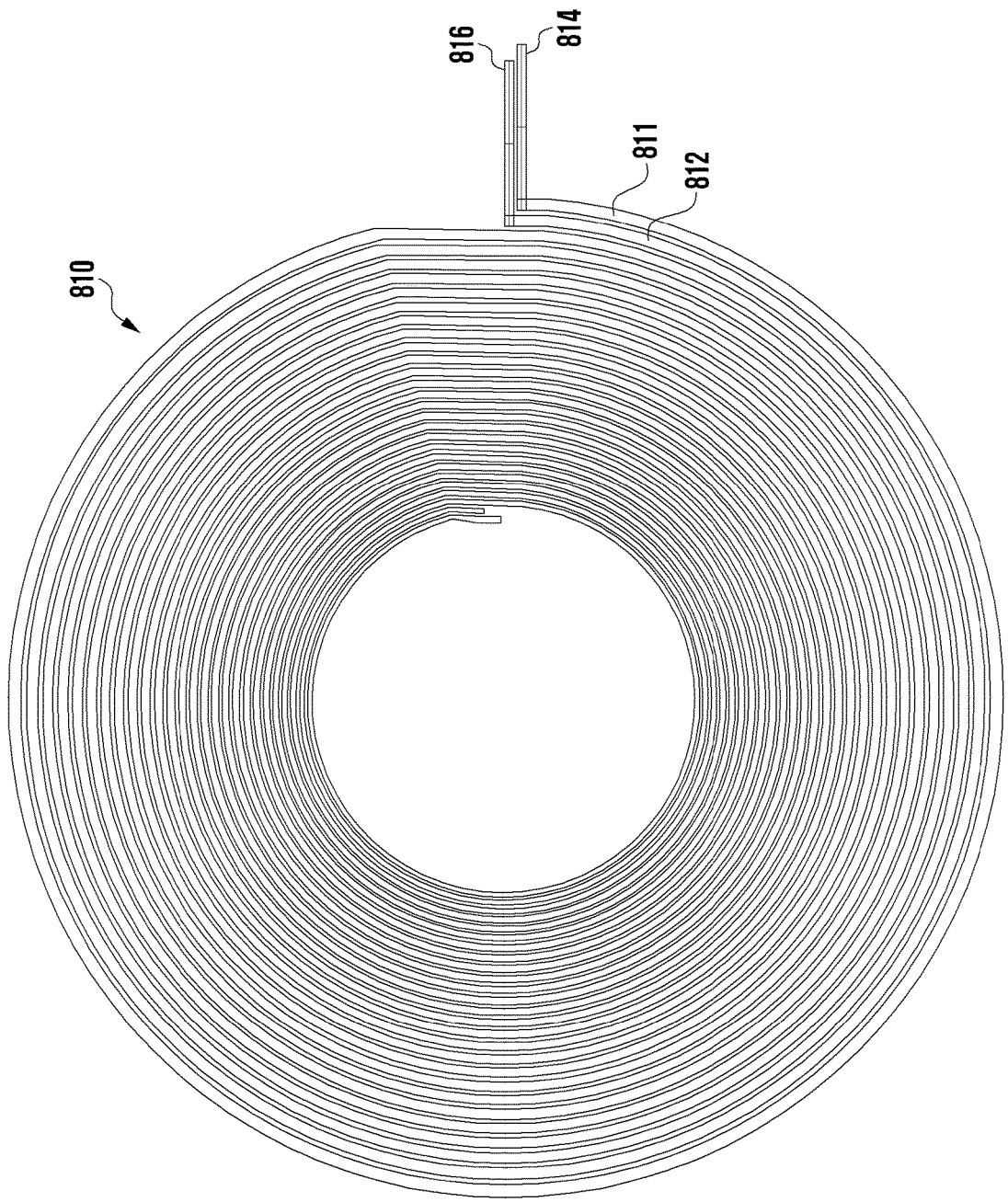
FIG. 13 is a diagram illustrating another example configuration of a first coil pattern portion according to various embodiments of the disclosure.

FIG. 13 is a diagram illustrating another example configuration of a first coil pattern portion according to various embodiments of the disclosure.

With reference to FIG. 13, a first coil pattern portion 810 according to various embodiments of the disclosure may include a pattern in which a first pattern 811 and a second pattern 812 are wound a plurality of times in a spiral shape.

According to an example embodiment, a first connection terminal 814 may be connected to the outer end of the first pattern 811. For example, the first connection terminal 814 may be electrically connected to the wireless charging circuit 411 of FIG. 4 or the power transmission circuit 310 or the power receiving circuit 350 of FIG. 3.

According to an example embodiment, a second connection terminal 816 may be connected to the outer end of the second pattern 812. For example, the second connection terminal 816 may be electrically connected to the wireless charging circuit 411 of FIG. 4 or the power transmission circuit 310 or the power receiving circuit 350 of FIG. 3.

According to various example embodiments of the disclosure, by designing the electronic device 500 to have a function of wirelessly transmitting and/or receiving power using the wireless charging coil 530, the electronic device 500 may wirelessly charge the other electronic device 402 and the external electronic device 302 (e.g., watch or earbud) in which the remaining battery capacity is insufficient.

According to various example embodiments of the disclosure, by designing an electronic device to have a function of wirelessly transmitting and/or receiving power using a wireless charging coil, the electronic device can wirelessly charge another electronic device, a watch, and an earbud in which the remaining battery capacity is insufficient.

According to various example embodiments of the disclosure, using a wireless charging coil configured by winding two coil patterns in one set, an electronic device can improve current distribution, reduce equivalent series resistance (ESR) and parasitic capacitance, and reduce heat generation.

While the disclosure has been illustrated and described with reference to various example embodiments thereof, it will be understood by those skilled in the art that various changes in form and details may be made therein without departing from the scope of the subject matter as defined, for example, by the appended claims.

What is claimed is:

1. A wireless charging coil, comprising:
   a printed circuit board;
   a first coil disposed on a first side of the printed circuit board; and
   a second coil disposed on a second side of the printed circuit board opposite the first side,
   wherein the first coil comprises:
      a first pattern and a second pattern, each of the first pattern and the second pattern in a spiral shape, and
      at least one first through-hole provided at a specific position of the first pattern and the second pattern,
   wherein the second coil comprises:
      a third pattern in a spiral shape, and a fourth pattern having a partial area being short-circuited and in a spiral shape, and
      at least one second through-hole provided at a specific position of the third pattern and the fourth pattern,
   wherein the first coil and the second coil are electrically connected to each other through the first through-hole and the second through-hole, and
   wherein a width of an inner loop of the first pattern is smaller than a width of an outer loop of the first pattern, and a width of an inner loop of the second pattern is smaller than a width of an outer loop of the second pattern.

2. The wireless charging coil of claim 1, wherein the first pattern and the third pattern are electrically connected to each other through the first through-hole, and the second pattern and the fourth pattern are electrically connected to each other through the second through-hole.

3. The wireless charging coil of claim 1, wherein a first connection terminal is connected to an outer end of the first pattern and an outer end of the second pattern, and
   a second connection terminal is connected to an inner end of the first pattern and an inner end of the second pattern.

4. The wireless charging coil of claim 3, wherein at least one of the first connection terminal and the second connection terminal is electrically connected to a wireless charging circuit configured to wirelessly transmit and/or receive power.

5. The wireless charging coil of claim 4, wherein at least one through-hole is provided at a specific position of at least one of the first connection terminal and the second connection terminal.

6. The wireless charging coil of claim 1, wherein widths of the first pattern and widths of the second pattern are identically configured.

7. The wireless charging coil of claim 1, wherein a width of the first pattern is larger than a width of the second pattern.

8. The wireless charging coil of claim 1, wherein the first through-hole includes a plurality of holes aligned in a row or a plurality of holes aligned in a plurality of rows, and wherein the second through-hole includes a plurality of holes aligned in a row or a plurality of holes aligned in a plurality of rows.

9. The wireless charging coil of claim 1, wherein a third connection terminal is connected to at least a portion of inner ends of the third pattern and the fourth pattern.

10. The wireless charging coil of claim 9, wherein the third connection terminal is electrically connected to a wireless charging circuit configured to wirelessly transmit and/or receive power.

11. The wireless charging coil of claim 1, wherein for each of the first pattern and the second pattern, a width thereof decreases from an outside direction to an inside direction of the wireless charging coil, and for each of the third pattern and the fourth pattern, a width thereof decreases from the outside direction to the inside direction of the wireless charging coil.

12. The wireless charging coil of claim 1, wherein the first pattern and the second pattern are electrically connected to each other through at least one connection portion comprising an electrically conductive material disposed in a periphery of the first through-hole.

13. The wireless charging coil of claim 1, wherein the third pattern and the fourth pattern are electrically connected to each other through at least one connection portion comprising an electrically conductive material disposed in a periphery of the second through-hole.

14. The wireless charging coil of claim 1, wherein a first connection terminal is connected to the outer end of the first pattern, wherein a second connection terminal is connected to the outer end of the second pattern, and wherein the first connection terminal and/or the second connection terminal are/is electrically connected to a wireless charging circuit configured to wirelessly transmit and/or receive power.

15. The wireless charging coil of claim 1, wherein a width of an inner loop of the third pattern is smaller than a width of an outer loop of the third pattern, and a width of an inner loop of the fourth pattern is smaller than a width of an outer loop of the fourth pattern.

16. An electronic device, comprising:

a battery;

a wireless charging coil;

a wireless charging circuit configured to wirelessly transmit and/or receive power via the wireless charging coil; and a processor electrically connected to the battery, the wireless charging coil, and the wireless charging circuit, wherein, based at least on another electronic device being positioned within a specified transmission and/or reception distance of the electronic device, the processor is configured to control the electronic device to transmit power stored in the battery to the other electronic device using the wireless charging coil and the wireless charging circuit;

wherein the wireless charging coil comprises:

a printed circuit board;

a first coil disposed on a first side of the printed circuit board; and a second coil disposed on a second side of the printed circuit board opposite the first side, wherein the first coil comprises:

a first pattern and a second pattern, each in a spiral shape, and at least one first through-hole provided at a specific position of the first pattern and the second pattern, wherein the second coil comprises:

a third pattern in a spiral shape, and a fourth pattern having a partial area that is short-circuited and in a spiral shape, and at least one second through-hole provided at a specific position of the third pattern and the fourth pattern, wherein the first coil and the second coil are electrically connected to each other through the first through-hole and the second through-hole, wherein widths of the first pattern and the second pattern decrease from an outside direction to an inside direction of the wireless charging coil;

wherein a first connection terminal is connected to an outer end of the first pattern and an outer end of the second pattern, wherein a second connection terminal is connected to an inner end of the first first coil pattern and an inner end of the second pattern, and wherein at least one of the first connection terminal and the second connection terminal is electrically connected to the wireless charging circuit.

17. The electronic device of claim 16, wherein widths of the first pattern and widths of the second pattern are identically configured.

18. The electronic device of claim 16, wherein widths of the third pattern and widths of the fourth pattern decrease from the outside direction to the inside direction.

* * * * *